(12) United States Patent
Sung et al.

(10) Patent No.: US 9,129,591 B2
(45) Date of Patent: Sep. 8, 2015

(54) RECOGNIZING SPEECH IN MULTIPLE LANGUAGES

(71) Applicant: Google Inc., Mountain View, CA (US)

(72) Inventors: Yun-hsuan Sung, Mountain View, CA (US); Francoise Beaufays, Mountain View, CA (US); Brian Strope, Palo Alto, CA (US); Hui Lin, Seattle, WA (US); Jui-Ting Huang, Fremont, CA (US)

(73) Assignee: Google Inc., Mountain View, CA (US)

( * ) Notice: Subject to any disclaimer, the term of this patent is extended or adjusted under 35 U.S.C. 154(b) by 330 days.

(21) Appl. No.: 13/726,954

(22) Filed: Dec. 26, 2012

(65) Prior Publication Data

US 2013/0238336 A1    Sep. 12, 2013

Related U.S. Application Data

(60) Provisional application No. 61/608,213, filed on Mar. 8, 2012.

(51) Int. Cl.
*G10L 15/28* (2013.01)
*G10L 15/00* (2013.01)
*G10L 15/32* (2013.01)
*G10L 15/183* (2013.01)

(52) U.S. Cl.
CPC .............. *G10L 15/005* (2013.01); *G10L 15/32* (2013.01); *G10L 15/183* (2013.01)

(58) Field of Classification Search
CPC ....... G10L 15/00; G10L 15/005; G10L 15/01; G10L 15/18; G10L 15/26; G10L 15/265; G10L 2015/00; G10L 2015/06; G10L 2015/22; G10L 2015/228

USPC .............................. 704/255, 231, 235, 251, 8
See application file for complete search history.

(56) References Cited

U.S. PATENT DOCUMENTS

| | | | |
|---|---|---|---|
| 5,524,169 A | 6/1996 | Cohen et al. | |
| 5,805,771 A | 9/1998 | Muthusamy et al. | |
| 5,865,626 A | 2/1999 | Beattie et al. | |
| 5,987,414 A | 11/1999 | Sabourin et al. | |
| 6,125,341 A | 9/2000 | Raud et al. | |
| 6,999,932 B1 | 2/2006 | Zhou | |
| 7,383,182 B2 | 6/2008 | Taylor | |
| 7,761,297 B2 | 7/2010 | Lee | |
| 8,190,420 B2 * | 5/2012 | Kadirkamanathan et al. | 704/8 |
| 2004/0073425 A1 | 4/2004 | Das et al. | |
| 2004/0215456 A1 | 10/2004 | Taylor | |

(Continued)

OTHER PUBLICATIONS

Chang et al. "Recognizing English Queries in Mandarin Voice Search," ICASSP 2011, 2011, 4 pages.

(Continued)

*Primary Examiner* — Qi Han
(74) *Attorney, Agent, or Firm* — Fish & Richardson P.C.

(57) ABSTRACT

Speech recognition systems may perform the following operations: receiving audio; recognizing the audio using language models for different languages to produce recognition candidates for the audio, where the recognition candidates are associated with corresponding recognition scores; identifying a candidate language for the audio; selecting a recognition candidate based on the recognition scores and the candidate language; and outputting data corresponding to the selected recognition candidate as a recognized version of the audio.

18 Claims, 5 Drawing Sheets

(56) References Cited

U.S. PATENT DOCUMENTS

| | | | |
|---|---|---|---|
| 2005/0119897 | A1 | 6/2005 | Bennett et al. |
| 2007/0033039 | A1 | 2/2007 | Taylor |
| 2007/0271088 | A1* | 11/2007 | Waibel et al. ............ 704/9 |
| 2008/0052077 | A1 | 2/2008 | Bennett et al. |
| 2008/0162146 | A1* | 7/2008 | Eckert et al. ............ 704/275 |
| 2009/0157383 | A1 | 6/2009 | Cho et al. |
| 2009/0281789 | A1* | 11/2009 | Waibel et al. ............ 704/3 |
| 2010/0161337 | A1 | 6/2010 | Pulz et al. |
| 2010/0191530 | A1 | 7/2010 | Nakano et al. |
| 2011/0066634 | A1 | 3/2011 | Phillips et al. |
| 2012/0010886 | A1 | 1/2012 | Razavilar |

OTHER PUBLICATIONS

Gales, "Semi-Tied Covariance Matrices for Hidden Markov Models," *Speech and Audio Processing: IEEE Trans SAP*, 1999, 7(3):272-281.

Povey et al., "Boosted MMI for model and feature-space discriminative training," ICASSP 2008, 4 pages.

Riley, 'OpenFst Library' [online]. 2012, [retrieved on Oct. 9, 2012]. Retrieved from the Internet: URL<http://www.openfst.org/twiki/bin/view/FST/WebHome>. 2 pages.

Tucker, 'CAL online' [online]. "A Global Perspective on Bilingualism and Bilingual Education," CMU, 1999, [retrieved on Dec. 20, 2012]. Retrieved from the Internet:URL <http://www.cal.org/resources/Digest/digestglobal.html>. 3 pages.

Vu et al., "Rapid building of an ASR system for Under-Resourced Languages based on Multilingual Unsupervised Training," 2011, Interspeech 2011, 4 pages.

Schultz, et al. "Language-independent and language-adaptive acoustic modeling for speech recognition" *Speech Communication* vol. 35 (2001), pp. 31-51.

Köhler "Language Adaptation of Multilingual Phone Models for Vocabulary Independent Speech Recognition Tasks" ICASSP (1998) pp. 417-420.

Alberti, et al. "Discriminative Features for Language Identification" Interspeech 2011, pp. 2917-2920.

Campbell, et al. "Support vector machines for speaker and language recognition" *Computer Speech and Language 20* (2006) pp. 210-229.

Huang, et al. "System Combination to Recognize Mandarin and Accented English" ICASSP 2012, 4 pages.

Shan "Search by Voice in Mandarin Chinese" Interspeech 2010, pp. 354-357.

Hieronymus and Kadambe, "Robust Spoken Language Identification Using Large Vocabulary Speech Recognition", 1997 IEEE International Conference on Acoustics, Speech, and Signal Processing Speech Processing. Munich, Apr. 21-24, 1997; [IEEE International Conference on Acoustics, Speech, and Signal Processing (Icassp)], Los Alamitos, IEEE Comp. Soc. Press, Apr. 21, 1997, pp. 1111-1114.

Invitation to Pay Additional Fees in International Application No. PCT/US2013/029877, mailed Jun. 13, 2013, 7 pages.

Muthusamy et al, "Reviewing automatic language identification" IEEE Signal Processing Magazine, Ieee Service Center, Piscataway, NJ, US, vol. 11, No. 4, Oct. 1, 1994, pp. 33-41.

Navratil, J., "Spoken Language Recognition—A Step Toward Multilinguality in Speech Processing", IEEE Transactions on Speech and Audio Processing, IEEE Service Center, New York, NY, US, vol. 9, No. 6, Sep. 1, 2001 8 pages.

Yan et al, "Development of an Approach to Automatic Language Identification Based on Phone Recognition", Computer Speech and Language, Elsevier, London, GB, vol. 10, No. 1, Jan. 1, 1996, pp. 37-54.

Zissman M A, "Comparison of Four Approaches to Automatic Language Identification of Telephone Speech", IEEE Transactions on Speech and Audio Processing, IEEE Service Center, New York, NY, US, vol. 4, No. 1, Jan. 1, 1996, pp. 31-44.

International Preliminary Report and Patentability in International Application No. PCT/US2013/029877, mailed Sep. 9, 2014, 13 pages.

International Search Report and Written Opinion in International Application PCT/US2013/029877, Date Mailed Sep. 2, 2013, 19 pages.

* cited by examiner

RECOGNIZING SPEECH IN MULTIPLE LANGUAGES

CROSS-REFERENCE TO RELATED APPLICATION

Priority is hereby claimed to U.S. Provisional Application No. 61/608,213, which was filed on Mar. 8, 2012. The contents of U.S. Provisional Application No. 61/608,213 are hereby incorporated by reference into this disclosure.

TECHNICAL FIELD

This disclosure generally relates to speech recognition.

BACKGROUND

Speech recognition includes processes for converting spoken words to text or other data. In general speech recognition systems translate verbal utterances into a series of computer-readable sounds and compare those sounds to known words. For example, a microphone may accept an analog signal, which is converted into a digital form that is then divided into smaller segments. The digital segments can be compared to the smallest elements of a spoken language, called phonemes (or "phones"). Based on this comparison, and an analysis of the context in which those sounds were uttered, the system is able to recognize the speech.

To this end, a typical speech recognition system may include an acoustic model, a language model, and a dictionary. Briefly, an acoustic model includes digital representations of individual sounds that are combinable to produce a collection of words, phrases, etc. A language model assigns a probability that a sequence of words will occur together in a particular sentence or phrase. A dictionary transforms sound sequences into words that can be understood by the language model.

SUMMARY

Described herein are speech recognition systems that may perform the following operations: receiving audio; recognizing the audio using language models for different languages to produce recognition candidates for the audio, where the recognition candidates are associated with corresponding recognition scores; identifying a candidate language for the audio; selecting a recognition candidate based on the recognition scores and the candidate language; and outputting data corresponding to the selected recognition candidate as a recognized version of the audio. The speech recognition systems may include one or more of the following features, either alone or in combination.

Identification of the candidate language may be performed substantially in parallel with recognition of the audio using the language models for different languages, or the identification may occur prior to recognition of the audio using the language models for different languages. Selecting the recognition candidate may include taking agreement of different language models into account when deciding which recognition candidate to select.

The above-described systems may include selecting the language models. The language models may be selected based on input from a user from whom the audio is received.

Selecting the language models may include: identifying languages associated with previously-received audio; and selecting language models corresponding to the identified languages.

Selecting the language models may include: identifying languages associated with previously-received audio; outputting data corresponding a user interface that presents indications of the identified languages; receiving selections from the user interface corresponding to one or more of the identified languages; and selecting language models based on the received selections.

At least one of the language models may be for multiple, different languages. The audio may include a part in a first language and part in a second language. Recognizing the audio may include: for the first part, producing a recognition score in a first language model that is disproportionate to recognition scores produced by the first language model bordering the first part; and for the second part, producing a recognition score in a second language model that is disproportionate to recognition scores produced by the second language model bordering the second part. Identifying a candidate language for the audio may include identifying the first language for the first part and the second language for the second part. Selecting a recognition candidate may include: selecting a first recognition candidate for the first part based, at least in part, on the recognition score produced by the first language model; and selecting a second recognition candidate for the second part based, at least in part, on the recognition score produced by the second language model. The data output may correspond to the first recognition candidate and the second recognition candidate.

The first part and the second part may border each other in the audio.

The systems and techniques described herein, or portions thereof, may be implemented as a computer program product that includes instructions that are stored on one or more non-transitory machine-readable storage media, and that are executable on one or more processing devices. The systems and techniques described herein, or portions thereof, may be implemented as an apparatus, method, or electronic system that may include one or more processing devices and memory to store executable instructions to implement the stated functions.

The details of one or more implementations are set forth in the accompanying drawings and the description below. Other features, objects, and advantages will be apparent from the description and drawings, and from the claims.

BRIEF DESCRIPTION OF THE DRAWINGS

Like reference symbols in the various drawings indicate like elements.

DETAILED DESCRIPTION

Described herein are processes for recognizing speech in multiple languages. In general, users who speak multiple languages, or users who speak a language that includes a substantial number of words borrowed from other languages, have presented challenges for speech recognition systems.

Some speech recognition systems can recognize many different languages, but users need to select one language they would like to use. Switching between languages can be inconvenient and add extra setup tasks for users. By some estimates, more than 50% people are multilingual and use more than one language in their daily life. Implementations of the speech recognition techniques described in this document may satisfy the linguistic needs of such users by providing a voice search system which can recognize more than one language and can reduce the amount of configuration needed for users to select the languages that they wish to have recognized.

Figure 1:
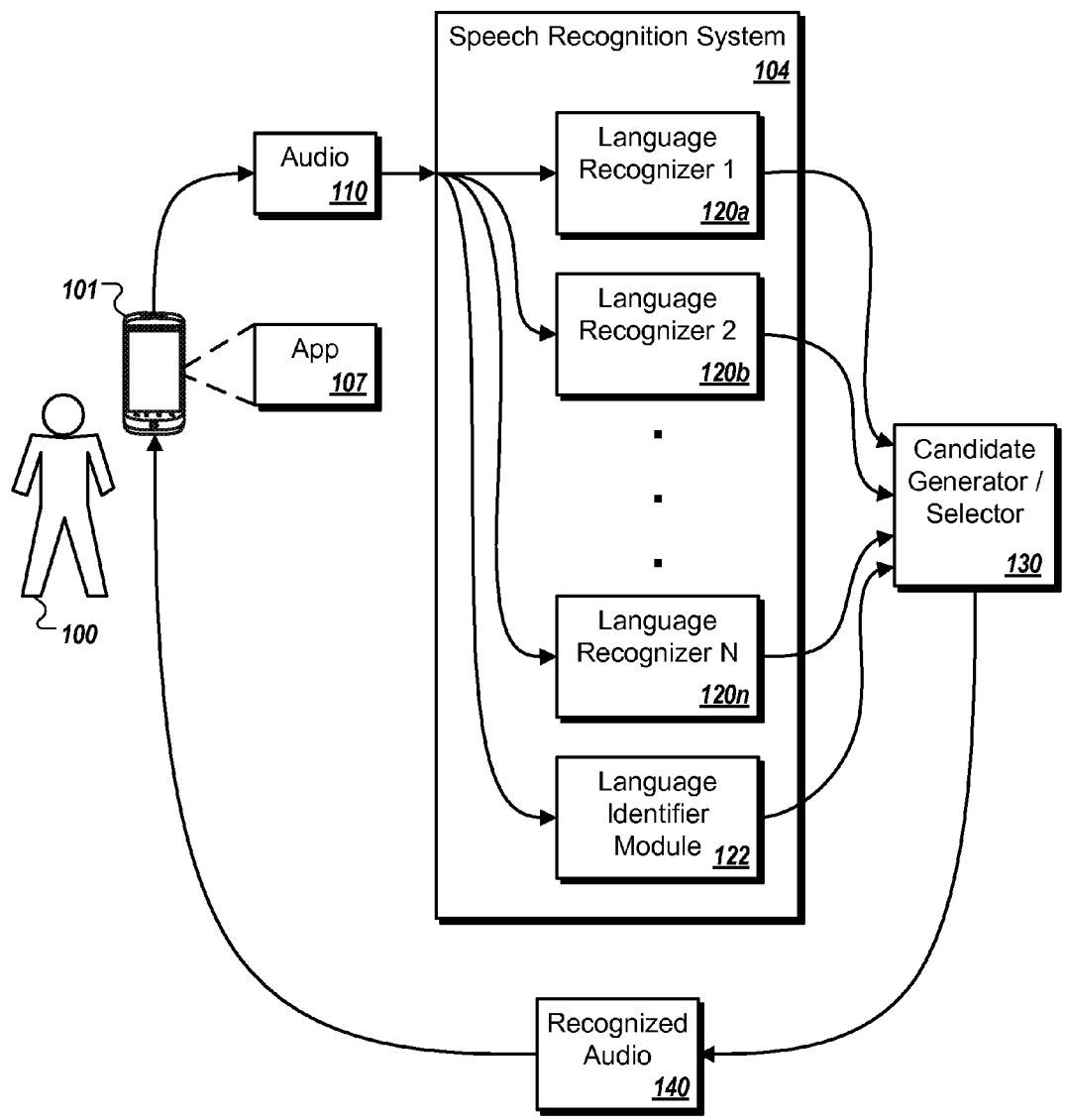
FIG. 1 shows, conceptually, an example of the speech recognition processes described herein.

FIG. 1 shows a conceptual example of a system for performing speech recognition in multiple languages. In the example of FIG. 1, a user 100 of a mobile device 101 accesses a speech recognition system 104. In this example, the mobile device 101 is a cellular telephone having advanced computing capabilities, known as a smartphone. Speech recognition system 104 may be hosted by one or more server(s) that is/are remote from mobile device 101. For example, speech recognition system 104 may be part of another service available to users of the mobile device 101 (e.g., a help service, a search service, etc.).

In this example, the mobile device 101 may include an application 107 ("app") that receives input audio spoken by the user 100 and that transmits data representing that input audio to the speech recognition system 104. The app 107 may have any appropriate functionality, e.g., it may be a search app, a messaging app, an e-mail app, and so forth. In this regard, an app is used as an example in this case. However, all or part of the functionality of the app 107 may be part of another program downloaded to the mobile device 101, part of another program provisioned on the mobile device 101, part of the operating system of the mobile device 101, or part of a service available to the mobile device 101.

In an example, the app 107 may ask the user 100 to identify, beforehand, the languages that the user 100 speaks. The user 100 may select, e.g., via a touch-screen menu item or voice input, the languages that the user 100 expects to speak or have recognized. In some implementations, the user 100 may also select among various accents or dialects. Alternatively, the user's languages, accents, and/or dialects may be determined based on the audio input itself or based on prior audio or other input, as described elsewhere herein.

To begin the speech recognition process, user 100 speaks in a language (e.g., English) into mobile device 101. App 107 generates audio data 110 that corresponds to the input speech, and forwards that audio data to the speech recognition system 104. The speech recognition system 104 provides the audio data 110 to a collection of language recognition modules 120a-120n and a language identifier module 122.

Each of the language recognition modules 120a-120n represents a speech recognizer that is tuned to recognize speech in a particular one of the languages selected by or for the user 100. For example, the user 100 may be trilingual in English, French, and Mandarin Chinese, and through the aforementioned language selection process, the audio data 110 may be provided to three of the language recognition modules 120a-120n that have been tuned for the recognition of English, French, and Mandarin, respectively.

Each of the language recognition modules 120a-120n processes the audio data 110 as if the audio data 110 included content spoken in the language associated with that particular module. For example, a French language recognition module can attempt to recognize the audio data 110 as though the audio were French speech, and a Spanish language recognition module can attempt to recognize the audio data 110 as though the audio were Spanish speech. Each of the language recognition modules 120a-120n identifies one or more recognition candidates for each of the spoken words included in the audio data 110. For example, the user 100 may speak the word "sensor", and an English language recognition module may recognize the utterance as having a 20% likelihood of being the words "see more", and an 80% likelihood of being other word(s). Substantially simultaneously, a Spanish language recognition module may recognize the same utterance as having a 90% likelihood of being the word "sensor".

The language identifier module 122 processes the audio data 110 to identify the language (and, in some cases, accent or dialect) from the audio data 110, recognizes the audio, and generates recognition data that indicates the language(s) that were most likely spoken in the audio. In some implementations, the language identifier module 122 may identify languages by analyzing the phonology of the audio data 110 (e.g., identifying the phonemes or "phones", identifying the rhythms of the speech, analyzing the sequences or structures of the phonemes, and/or analyzing spectral characteristics). Although many languages rely on only a handful of phonemes, two languages rarely use exactly the same set. Furthermore, different speakers of the same language often differ from one another in the way their phonemes are patterned, producing "accents," which constitute one kind of variety within a language. This variety is generally not random; the speech sounds characteristic of any particular accent generally follow a pattern. Speakers with different accents are usually able to understand one another in most circumstances, but their distinctive articulation is a clue to their particular origins. For example, the language identifier module 122 may be able to differentiate the smooth sounds generally associated with French speech, the harsher and more guttural sounds of German speech, and the punctuated sounds of Italian.

The recognition candidates identified by the language recognition modules 120a-120n, and the recognition data generated by the language identifier module 122, are provided to a candidate generation and selection module 130. The candidate generation and selection module 130 compares, combines, and otherwise processes the provided information to identify the spoken audio. The word or words identified by the candidate generation and selection module 130 are then provided to the mobile device 101 as a collection of recognized audio 140. As described in more detail below, speech recognition system 104 receives input audio, recognizes that input audio, and generates the recognized audio 140.

The recognized audio 140 may include, e.g., a textual transcription of the audio, language information associated with included recognition candidates, or other information representative of its content.

In some implementations, the candidate generation and selection module 130 may identify a single, most likely recognition candidate for the audio data 110. For example, a spoken utterance may be recognized by only one of the language recognition modules 120a-120n with a high degree of confidence, and this identification may be further affirmed by the language identified by the language identification module 122. In other words, there is agreement between the language identification module 122 and the language recognition module that recognized the audio.

In some implementations, the candidate generation and selection module 130 may identify a collection of likely recognition candidates for the audio data 110. For example, a spoken utterance may be recognized by more than one of the language recognition modules 120a-120n with a high degree of confidence, such as the English word "see" and the Spanish word "sí" which are both pronounced substantially the same in both languages. In such an example, both the words "see" and "sí" may be provided as the recognized audio 140. In some implementations, the language identification module 122 may be used to distinguish and determine the correct recognition of the utterance. For example, an utterance may be recognized as "sí" in Spanish and "see" in English with equal confidence, however the language identification module 122 may indicate that the utterance was made in Spanish (e.g., the utterance is one of several utterances that have been identified as being Spanish), and this indication may be used to select the word "sí" as the recognized word.

Some utterances may have the same meaning and pronunciation in more than one language. For example, the word "no" has the same pronunciation and meaning in English, Spanish, and Kurdi. In some implementations, the selection of a recognition candidate can include taking agreement of different language models into account in deciding which recognition candidate to select. For example, a user who has been identified as speaking English, Spanish, and Kurdi and uttering the word "no" may cause the candidate generation and selection module 130 identify the utterance as the word meaning "negative response", which may satisfy any of the user's three languages, rather than the similarly pronounced word "know" which may only satisfy the English language. In such examples, the candidate generation and selection module 130 may select the word "no" rather than the word "know" based on its shared meaning among the selected languages.

The recognized audio 140 may be provided as data to the mobile device 101 that provided the input audio. For example, a user may input audio to the speech recognition system through the mobile device 101. The recognized audio 140 may be provided to the mobile device 101 or another service and used to control one or more functions associated with the mobile device 101. For example, an application on the mobile device 101 may execute an e-mail or messaging application in response to command(s) in the recognized audio 140. Likewise the recognized audio 140 may be used to populate an e-mail or other message. Processes may be implemented, either remote from, or local to, the mobile device 101, to identify commands in an application, such as "send e-mail" to cause actions to occur, such as executing an e-mail application, on the mobile device 101.

In another example, the recognized audio 140 may be provided as data to a search engine. For instance, the recognized audio 140 may constitute a search query that is to be input to a search engine. The search engine may identify content (e.g., Web pages, images, documents, and the like) that are relevant to the search query, and return that information to the computing device that provided the initial audio. In some implementations, the recognized audio may be provided to the computing device prior to searching in order to confirm its accuracy.

In another example, the recognized audio 140 may be used to determine advertisements related to the topic of the audio. Such advertisements may be provided in conjunction with output of the audio content.

Figure 2:
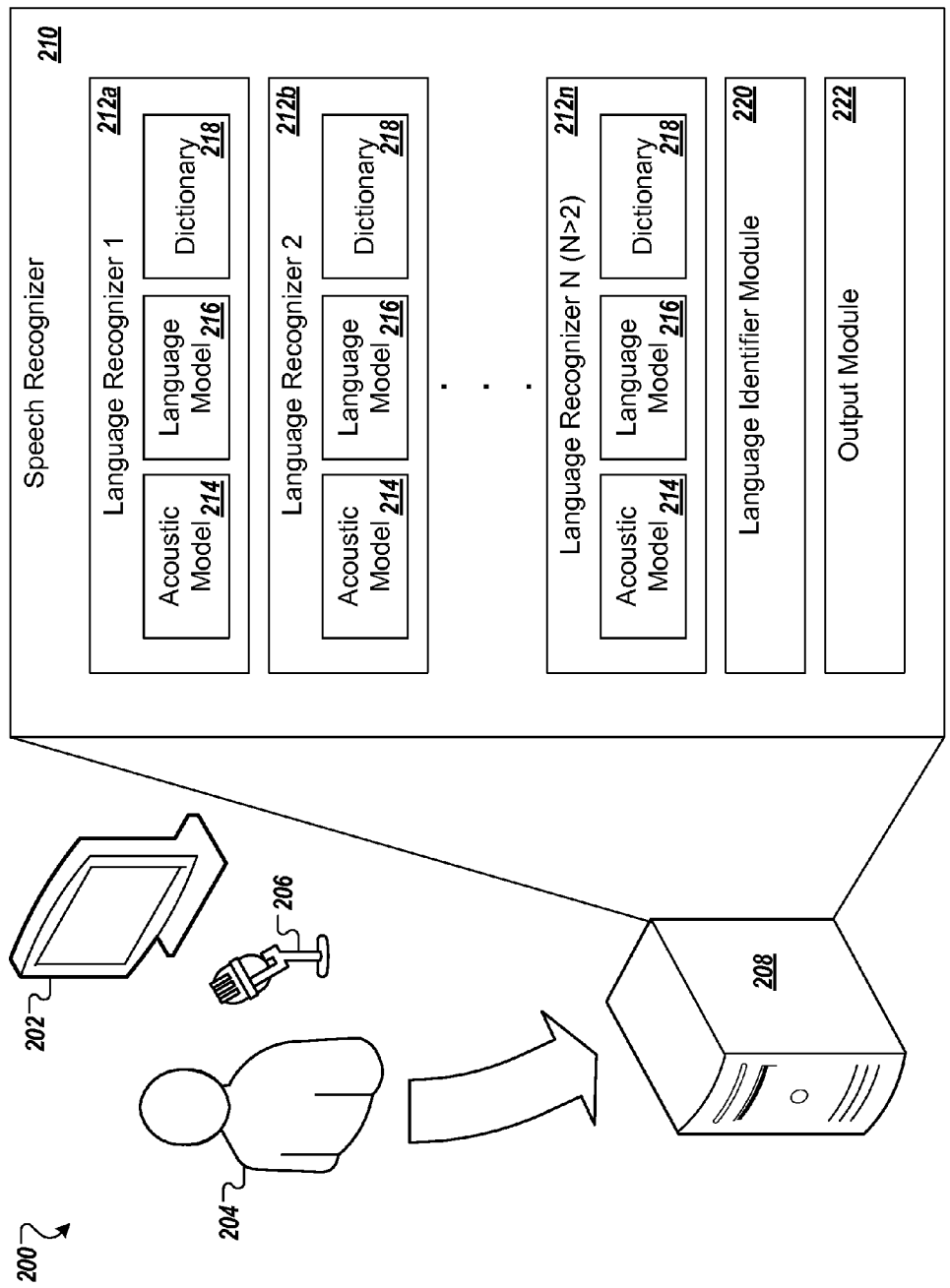
FIG. 2 illustrates an example of a system for recognizing speech according to the processes described herein.

FIG. 2 illustrates an example system for performing speech recognition. In this example arrangement, user 204 speaks into a microphone 206 of computer system 202. Computer system 202 may be a standalone computer connected to a network or any computational device connected to a microphone, for example, a personal computer, a tablet computer, a smart phone, etc.

The user's speech is sent to computer system 208 over a network (not shown), e.g., the Internet. The computer system 208 includes a speech recognizer 210. In some implementations, the computer system 208 may be a server. The speech recognizer 210 may be the speech recognition system 104 of FIG. 1.

The speech recognizer 210 includes a collection of language recognizer components 212a-212n. Each of the language recognizer components 212a-212n is configured to perform recognition of speech in a particular language. In some implementations, the language recognizer components 212a-212n may be the language recognition modules 120a-120n of FIG. 1. Each of the language recognizer components 212a-212n may include an acoustic model 214, a language model 216, and a dictionary 218. For example, the acoustic model 214 can recognize sounds in utterances of speech. Language model 216 may be a composite model, in this example, in that it includes both general and topic-specific language models. The dictionary 318 may be a collection of phonetic arrangements for various pronunciations of words of the language with which the respective language recognizer component is associated.

Each language model 216 is representative of how a language, for example English, Spanish, or German, is generally spoken. The language models 216 need not be topic-specific, and may be generalized using standard word patterns in a language (e.g., the included words are weighted based on the statistical likelihood that each will be used in everyday speech patterns). The language model 216 contains, among other things, statistical representation of how often words co-occur in particular general or topic-specific contexts. Words are said to occur if they are used in a sentence without any intervening words. For example, in the phrase "the quick brown fox jumped over the lazy dog" co-occurrences of two words include "the quick", "quick brown", "brown fox", "fox jumped", "jumped over", "over the", "the lazy", and "lazy dog". Co-occurrences of three words include "The quick brown", "quick brown fox", "brown fox jumped", "fox jumped over", "jumped over the", "over the lazy", "the lazy dog".

A language identifier module 220 processes incoming speech audio to identify the language in which the audio is spoken. In some implementations, the language identifier module 220 can implement a process that is a discriminative extension to the MAP-SVM architecture widely used for such tasks. In MAP-SVM, a universal background Gaussian-mixture model (UBM) can be used to model each utterance as its maximum a posteriori departure from the UBM. The parameters of this model are then stacked in a 'supervector' that is classified by a support vector machine (SVM). The SVM can also use the confidence values from the individual recognizers as a feature when choosing a language. In an example implementation of the system, the confidences are combined and it is determined whether cross-lingual results are consistent (and that consistency is another feature for the SVM classifier).

An output module 222 receives the outputs of the language recognizer components 212a-212n and the language identifier module 220 to determine a collection of one or more recognition candidates. In some implementations, the collection determined by the output module can be a collection of similar-sounding words or phrases from multiple predetermined languages, and the collection may be provided to the computer system 202 such that the user 204 can select the correct recognition candidate for the word(s) that were spoken.

In some implementations, the language identifier module 220 can be used to select which of the language recognizer component's 212a-212n outputs to use as the output. For example, the language identification module 220 may determine that a particular utterance was mostly likely to be Korean speech, and based on this determination the output module 222 may output substantially only recognition candidates provided by a Korean language recognizer module.

Figure 3:
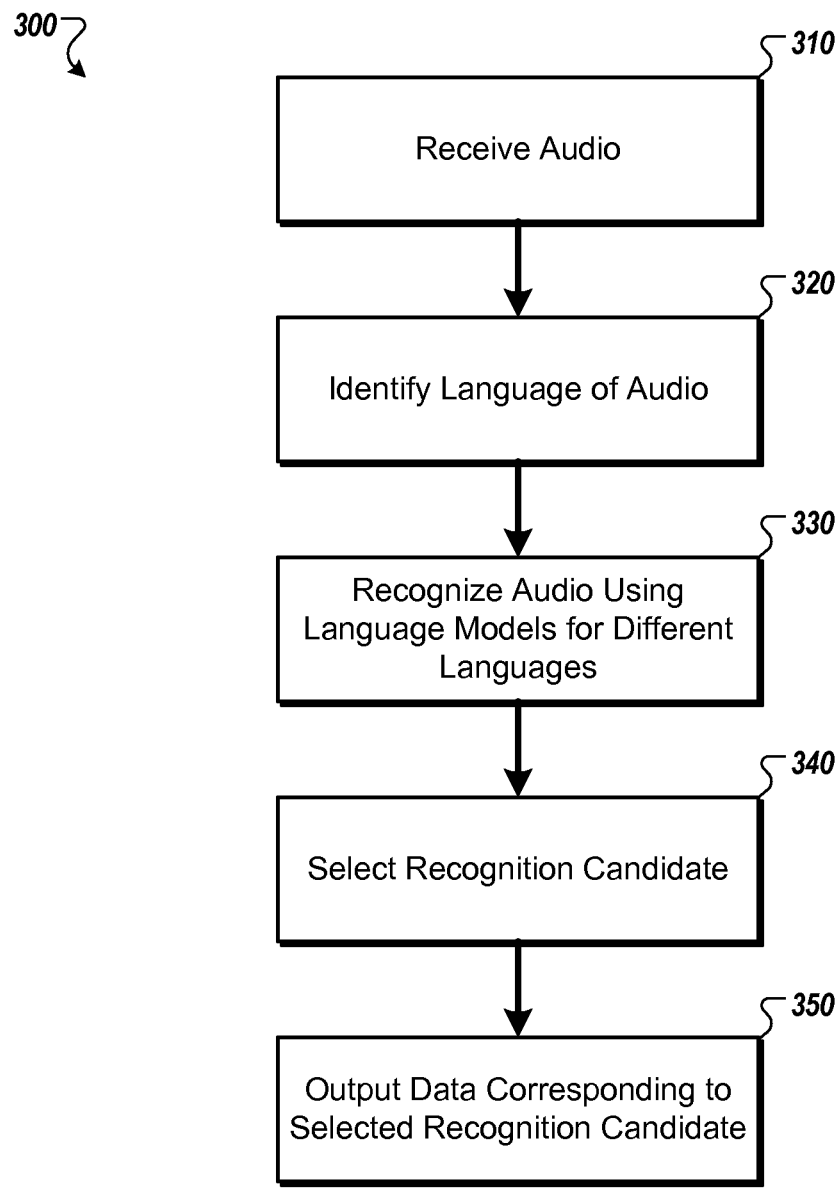
FIG. 3 is a flow diagram of a process for recognizing speech.

FIG. 3 is a flow diagram for an example process 300 for performing speech recognition. Process 300 may be performed by speech recognizer 210 for FIG. 2, either alone or in combination with other appropriate computer programs.

In process 300, audio is received (310). For example, speech recognizer 210 may receive audio from a computing device, such as the computer system 202 or the mobile device 101 (FIG. 1). The input audio referred to herein may include all of the audio received between designated start and stop times, or a portion or snippet thereof. In the example described here, the audio is input speech; however, any type of audio may be received. For example, the audio may be a recorded musical track, a recorded track associated with video, and so forth. Phones are identified in the input audio and may be used, as described below, to identify the language of the audio.

The language of the received audio is identified (320). For example, the language identifier 220 may detect and analyze the phonemes, rhythmic patterns, intonation patterns, and other appropriate structures of speech to identify the language in which the received audio is spoken.

The input audio is recognized (330) using language models for different languages to produce recognition candidates for the audio. The recognition candidates are associated with corresponding recognition scores. In some implementations, substantially all available language models may be used to produce the recognition candidates. For example, the language models 216 of the language recognizer components 212a-212n may process the received audio. In some implementations, a predetermined subset of language models may be used to produce the recognition candidates. For example, the language models 216 of selected ones of the language recognizer components 212a-212n may process the received audio. In such examples, acoustic models for the identified languages (here, English, Spanish, and French) can identify phonetic patterns associated with the input audio. Each identified language model can apply the output of the acoustic models to the corresponding vocabulary, word combinations, and syntax of that identified language model to produce recognition candidates for the input audio. User selection of language subsets is discussed in the description of FIG. 4.

The recognition candidates are associated with corresponding scores. The score for each recognition candidate is indicative of the statistical likelihood that the recognition candidate is an accurate match for the input audio. In this example, the higher the score is for a recognition candidate, the more likely it is that the recognition candidate is an accurate match for the input audio. In some implementations, the scores of the different language recognizer components may be normalized. For example, the scores may be summed, and each score divided by that sum to produce a normalized score.

In some implementations, the language of the audio may be identified (320) substantially in parallel with the recognition (330) of audio using the language models. For example, the input audio may be provided to one or more language recognizer components and the language identifier module at substantially the same time, and each process may be executed by substantially independent processing threads, processors, or computers.

In some implementations, at least one of the language models may be for multiple, different languages. In this regard, some language models may include elements of more than one language, for example the English language includes many French terms (e.g., "rendezvous"), and some Mandarin language models include many English terms. In some examples, linguistic overlap among two or more language models may improve speech recognition. For example, if an utterance is recognized as a word in an English language model, and the same word is recognized in a Mandarin language model that includes English elements, then the redundant recognitions may reinforce the likelihood that the word was identified correctly. This recognition may be further reinforced by the language identification provided by the language identifier (e.g., the language identifier module 220).

A recognition candidate is selected (340) based on the recognition scores (e.g., which are highest) and the candidate language. In some implementations, multiple language recognizers may each provide one or more recognition candidates for an utterance in their respective languages. Each of these candidates may be accompanied by a corresponding confidence score. The scores for the candidates can then be modified by scores provided by a language identifier module. For example, two or more of the language recognition components 212a-212n may provide their respective highest scoring candidates, and the language identification module 220 may provide one or more language scores that indicate in which language(s) the audio was most likely spoken. The scores of the multiple recognition candidates and the language scores may be used by the speech recognizer 210 to identify one of the candidates as the correct recognition of the input audio.

In some examples, if available, other factors may influence the ultimate recognition scores. For example, if the input audio is "Makhani Arbi Masala" (e.g., a vegetarian dish from India) and is spoken by a user who is known to generally speak only Hindi, a Hindi or other Indian language recognition component, and its corresponding output, may be weighted more heavily than others of the language recognition components to recognize the phrase. If it is known for a fact that the user is a speaker of Hindi, then process 300 may still be performed, e.g., input audio from the user may be processed by all available language recognition components or a portion thereof. In such cases, process 300 can still increase recognition accuracy, since speakers of a particular language may still utter words or phrases of other languages (e.g., searching for ethnic restaurants, identifying persons having names originating from other cultures, performing tourist actions, etc.) that are more prevalent in other languages than their primary language.

The selected output may be a phonetic representation of the input audio, along with other appropriate information identifying the word or phrase. The dictionary may be a program that is part of speech recognizer 210, as noted above.

Data corresponding to the selected recognition candidate is output (350) as a recognized version of the audio. For example, speech recognizer may output (350) the data to the appropriate device or process. In different examples, the output may be formatted as part of an XML file, a text transcription, a command or command sequence, a search query, and so forth. The data may be presented to the user, either audibly or visually, or it may be used as part of a process either on the user's device or elsewhere. For example, a transcription of the input audio may be applied to a translation service, which may be programmed to generate an audio and/or textual translation of the input audio into another, different language (e.g., from English to French) for output to the user's computing device. In some examples, the user may be able to specify the accent or dialect of the target language for the output audio. For example, if the input language is North American English, the user may be able to specify, e.g., Quebec or Haitian French. The specification of the accent or dialect may be done in response to an input from the user or it may be performed based on analysis of the input audio. For example, the system may select a version of the target language that is closest, geographically, to the version of the input language. Alternatively, the system may select the most popular (e.g., in terms of numbers of speakers) version of the target language. Other appropriate criteria may be used to select the accent(s) and/or dialect(s) of the target language(s).

In some implementations, the language may be identified (320) by comparing the outputs of two or more language recognizer components, such as the language recognizer components 212a-212n. For example, speech recognizer 210 may include language recognizer components for various languages, e.g., English, Spanish, French, and so forth. These language recognizers may include complete language models, e.g., for the full grammar and vocabulary of each language, or they may include abbreviated language models for use in recognizing common or frequently-used words of a particular language. The input audio may be processed by these language models (and their associated acoustic models and dictionaries) to identify the language of the input audio. For example, input speech may be processed by language models for English, French and Spanish, and the resulting language identification may be used, as described below. In some examples, a limited set of language models may be used to process received audio. For example, if speech recognizer 210 can identify the user and also knows that the user is fluent in English and French, the speech recognizer 210 may limit the language recognition components 212a-212n to English and French. In other implementations, a larger set of language recognition components 212a-212n (e.g., all available language models) may be used.

In other implementations, speech recognizer 210 may identify (320) the language of the received audio based on input from a user who is providing the audio. For example, the user may select, e.g., via a touch-screen menu item or voice input, their native (or other) language. Such a selection may be received and understood by speech recognizer 210.

In still other implementations, speech recognizer 210 may identify (320) the language of the received audio based on prior input from the user. For example, speech recognizer 210 may identify the user based, e.g., on identification information, such as the IP or MAC address of the user's computing device, the telephone number of the user's mobile device, and/or login information, such as a user ID and password associated with a user account. The speech recognizer 210 may consult a profile of the user or other stored information associated with the user. In this regard, the user may allow such information stored, or prevent speech recognizer 210 from accessing such information. The information may include, e.g., past inputs about which language(s) the user speaks and/or past determinations about which language(s) the user speaks based on past input audio.

In the examples above where the language of the user is determined (rather than input by the user himself or herself), speech recognizer 210 may request confirmation that the language determination is correct. For example, speech recognizer 210 may output data identifying the language. The data may be incorporated into a user interface, which is also output by speech recognizer 210 to the user's computing device, and which allows the user to confirm that the determined language is correct and/or to input a correct language or "try again", if necessary.

Other examples of use of the recognized audio are above.

Recognition candidates with the highest score may be indicative of the language that the user speaks. For example, if all, or a majority of, recognition candidates for input audio are from an English language model, it may be assumed that the user is a speaker of English and, furthermore, that the user would like access to services specific to English. Accordingly, if the input audio constitutes a search query, for example, then speech recognizer 310 may direct the search query to a search engine (or other service) that is specific to the English-speaking market. In some implementations, location information may be at least partly used to select recognition candidates. For example, for a user who in known to speak both Japanese and Korean, the speech recognizer may be able to determine the user's location (e.g., from GPS coordinates determined by an enable function of the mobile device 101) when the audio was spoken. In such an example, Korean recognition candidates may be given relatively greater statistical weight when the user is in Seoul, and Japanese recognition candidates may be given relatively greater statistical weight when the user is in Tokyo.

In some implementations, selecting (340) the language models can include identifying languages associated with previously-received audio, outputting data corresponding a user interface that presents indications of the identified languages, receiving selections from the user interface corresponding to one or more of the identified languages, and selecting language models based on the received selections. For example, a user may speak German and Italian when submitting audio for recognition. A language identification module may identify the user's utterances as including German and Italian components. In some cases, the language identification module identifies the language automatically, e.g., without interaction with the user. In some cases, the language identification module presents a user interface that indicates that German and Italian have been identified as having been spoken by the user among a list of other undetected languages. The user may be able to deselect the identified languages and/or selected unidentified languages. For example, the language identification module may incorrectly identify the user as being a speaker of Japanese based on the user's previous searches for Japanese restaurants or celebrities, and the user may deselect Japanese as a language that the speech recognition system should expect to recognize. By contrast, the language identification module may not include an additional language that the user may speak, simply because the user had not previously spoken the language to the system. In such examples, the user may manually select the additional language in addition to those already identified. These received language selections may then be used to select corresponding language models for use in recognizing the user's speech.

In some implementations, audio submitted for recognition may include a part in a first language and another part in a second language. Recognizing such audio can include, for the first part, producing a recognition score in a first language model that is disproportionate to recognition scores produced by the first language model bordering the first part. For the second part, a recognition score is produced in a second language model that is disproportionate to recognition scores produced by the second language model bordering the second part. Identifying a candidate language for the audio can include identifying the first language for the first part and the second language for the second part. Selecting a recognition candidate can include selecting a first recognition candidate for the first part based, at least in part, on the recognition score produced by the first language model. Selecting a second recognition candidate for the second part based, at least in part, on the recognition score produced by the second language model. The data output can correspond to the first recognition candidate and the second recognition candidate.

For example, an English-speaking tourist in Paris may initiate a voice process by saying "directions to the Cathédrale Saint-Maclou de Pontoise", in which the first part of the utterance is in English and the second part is in French. The utterance may be submitted to both a French language recognition component and an English language recognition candidate. In such an example, the English recognizer may provide relatively high confidence scores for the words in the first part of the utterance and relatively low confidence scores for the words in the latter portion of the utterance. By contrast, the French recognizer may provide comparatively low confidence scores for the words in the first part of the utterance and comparatively high confidence scores for the words in the latter portion of the utterance. In such an example, recognition candidates provided by the English recognizer may be used to identify the words in the first part of the utterance and recognition candidates provided by the French recognizer may be used to identify the words in the second part of the utterance. In some implementations, the first part and the second part may border each other in the audio. In the previous example, the English and French parts border each other in the spoken phrase.

In some implementations, the language(s) spoken by the user may be determined automatically (e.g., without user interaction). For example, the user's past history (e.g., prior utterances, textual communications, browsing history) may be analyzed to determine the user's language preferences and/or usage patterns. In such examples, the user may wish to have the option to further configure (e.g., fine tune) the selection of languages that he or she wishes to have recognized by a speech recognition system. In some implementations, the speech recognition system may be configured to query the user for this information upfront, for example, during the creation of a profile for a new user. In either of these examples, a graphical user interface may be presented to the user to assist in the selection of the language subset, although in other examples, such a graphical user interface may not be presented.

Figure 4A:
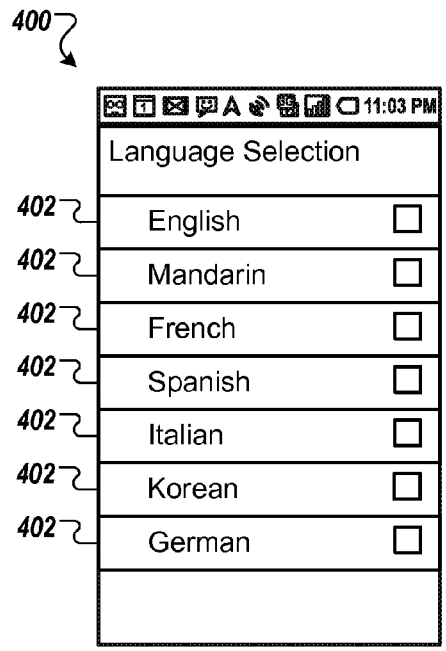
FIGS. 4A-4D show examples of a graphical user interface for selecting languages in which to recognize speech.

FIGS. 4A-4D show examples of a graphical user interface (GUI) 400 for selecting languages in which to recognize speech. In some implementations, the GUI 400 may be presented by the mobile device 101, although other GUIs with similar functionalities may be adapted for presentation by other types of computing devices. Referring to FIG. 4A, the GUI 400 presents a menu of languages from which the user may select. Each of the available languages is represented by a language menu item 402. In some implementations, the inventory of available languages presented by the GUI may reflect some or all of the languages represented by the collection of language recognition components 212*a*-212*n*.

Figure 4B:
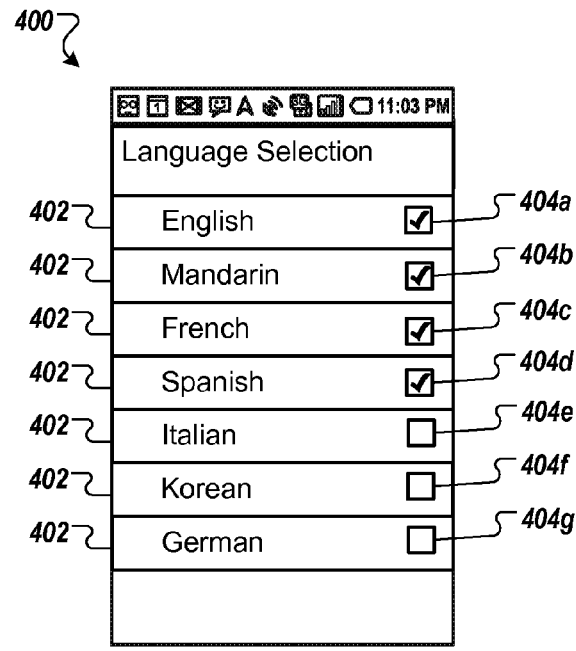

Referring to FIG. 4B, the GUI 400 indicates that the user has selected several languages (e.g., English, Mandarin, French, and Spanish in this example) that he or she expects to speak and have recognized. The user may select the languages by toggling checkbox controls 404*a*-404*g*. In the illustrated example, the user has selected the checkbox controls 404*a*-404*d* to indicate that the speech recognition system should expect to encounter speech in English, Mandarin, French, and/or Spanish.

Figure 4C:
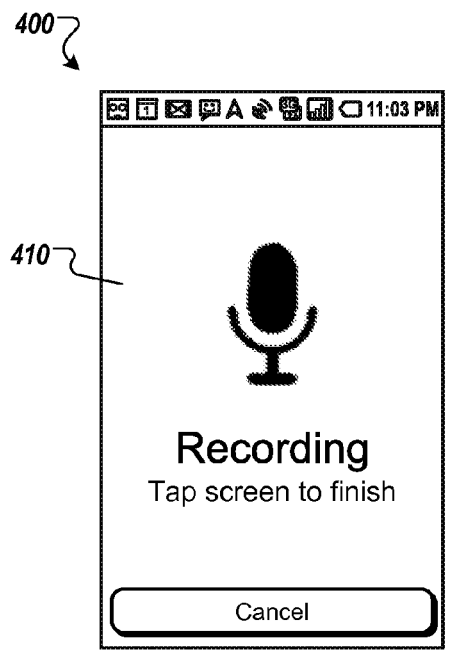

Referring to FIG. 4C, the GUI 400 is displayed in a recording mode. In the recording mode, a recording notification screen 410 is displayed while the device is accepting audio input from the user. During recording mode, the user may speak any of the languages previously indicated.

Figure 4D:
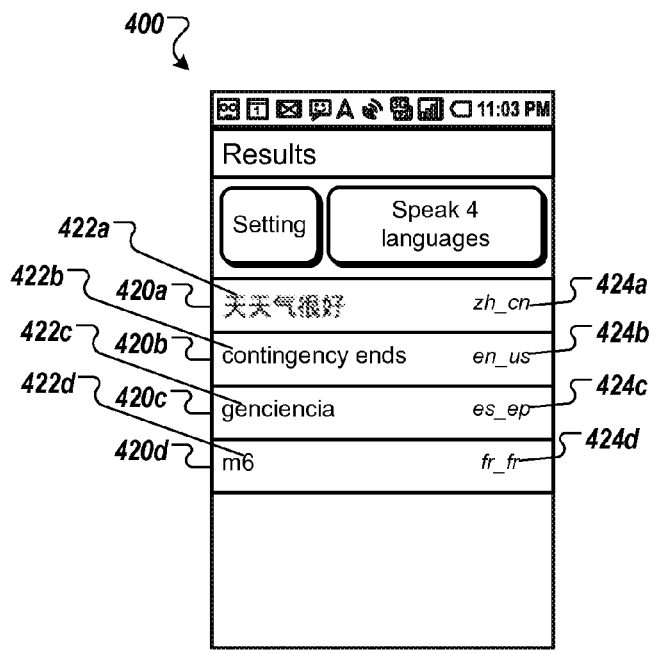

Referring to FIG. 4D, the GUI 400 displays a collection of speech recognition results 420*a*-420*d*. In the illustrated example, each of the speech recognition results 420*a*-420*d* represents the most likely speech recognition candidate for each of the previously selected languages, and is ranked according to the confidence with which each was identified. The speech recognition results 420*a*-420*d* include a corresponding recognition candidate 422*a*-422*d* and a corresponding language identifier 424*a*-424*d*. For example, the speech recognition results 420*c* includes the recognition candidate 422*c* "genciencia" and the language identifier 424*c* "es_ep" to indicate that the speech recognition result 420*c* was generated by a Castilian Spanish language recognition component (e.g., Español España).

In some implementations, the outputs of language recognizer components (e.g., components 212*a*-212*n*) may be combined with the output the language identifier module (e.g., module 220) by the output module (e.g., module 222) to determine the recognition candidates that will be provided by the output module. For example, a Japanese language recognizer may identify an utterance as a Japanese word with 80% confidence while a Vietnamese language recognizer may identify the same utterance with 90% as a Vietnamese word. Using only these two recognition candidates, the Vietnamese recognition candidate may be selected based on its higher associated confidence score. However, the language identifier module 220 may indicate with 90% confidence that the utterance was Japanese, and with 5% confidence that the utterance was Vietnamese. In such an example, the confidence scores of the language recognizers and the language identifier module 220 may be combined to determine that the utterance was most likely a Japanese word.

In some implementations, an output identifier module (e.g., the output identifier module 222) may use the results of one or more language recognizer components (e.g., components 212*a*-212*n*), operating substantially in parallel, to determine recognition candidates. Latency may be generally only bounded by the slowest module or component, which themselves may be subject to timeout durations (e.g., each recognizer may adhere to a common timeout duration and as such a collection of parallel recognizers may take no longer than the timeout duration). Several different implementations of this approach were tested.

The first approach includes comparing the confidence scores of two or more language recognizer components, and choosing the highest-confidence result. In a second approach, experimental confidence margins were also applied to each language recognizer component used. In a third approach, an extra constant is added to reinforce results where two recognizers agree.

In a continuation of the previously discussed exercises, an SVM with Gaussian kernel is trained to choose a recognition result based on the language recognizer components' confidence scores, the output of a language identification system (running in parallel with the speech recognizer components), and additional recognition agreement features (one per language pair). The SVM may be trained on the selected language sets.

In some implementations, similar multiple-language speech recognition tasks may be performed for other purposes. For example, an audio conference or video conference may include two or more participants who speak two or more different native languages. The primary language of each speaker may be identified, and the collection of identified languages may be used to determine a collection and weighting of language recognizer components for each participant. For example, one user can speak in his native language, a speech recognition system can transcribe the speech, and a language translator can output the translation to the other participants in their own native languages.

In some examples, participants may speak words or phrases from each other's native language. For example, a generally English-only speaker may attempt to speak French terms when speaking to a native French speaker, or Japanese terms when speaking to someone from Japan (e.g., names of towns or other proper nouns, idioms that do not translate well, attempts to impress or flatter the other speaker by using his native language). By using language recognition components for the collective assortment of users' languages and applying them to all the users in the conversation, speech from the multi-lingual discussion may recognized and transcribed.

In some implementations, multilingual users or users who are not fully fluent in another language may mix languages as they speak. For example, a user whose primary language is English may also know some Spanish, but not necessarily enough to be conversant. Such a user may attempt to speak Spanish, but then switch back into English in mid-sentence (e.g., to work around weaknesses in his knowledge of Spanish grammar or vocabulary, speaking "broken" Spanish). By identifying that the user is at least partly able to speak in more than one language, language recognition components for substantially all the user's languages may be used to transcribe speech that changes languages as the user speaks.

In some implementations, the user's skill in speaking various languages may influence scores provided by a language identifier. For example, speech from our English speaker of "broken" Spanish may most likely be in English, with a lesser probability of being in Spanish, and as such, only recognition candidates identified by a Spanish language recognizer component with a relatively high degree of confidence may be selected over English candidates for the same utterance.

Figure 5:
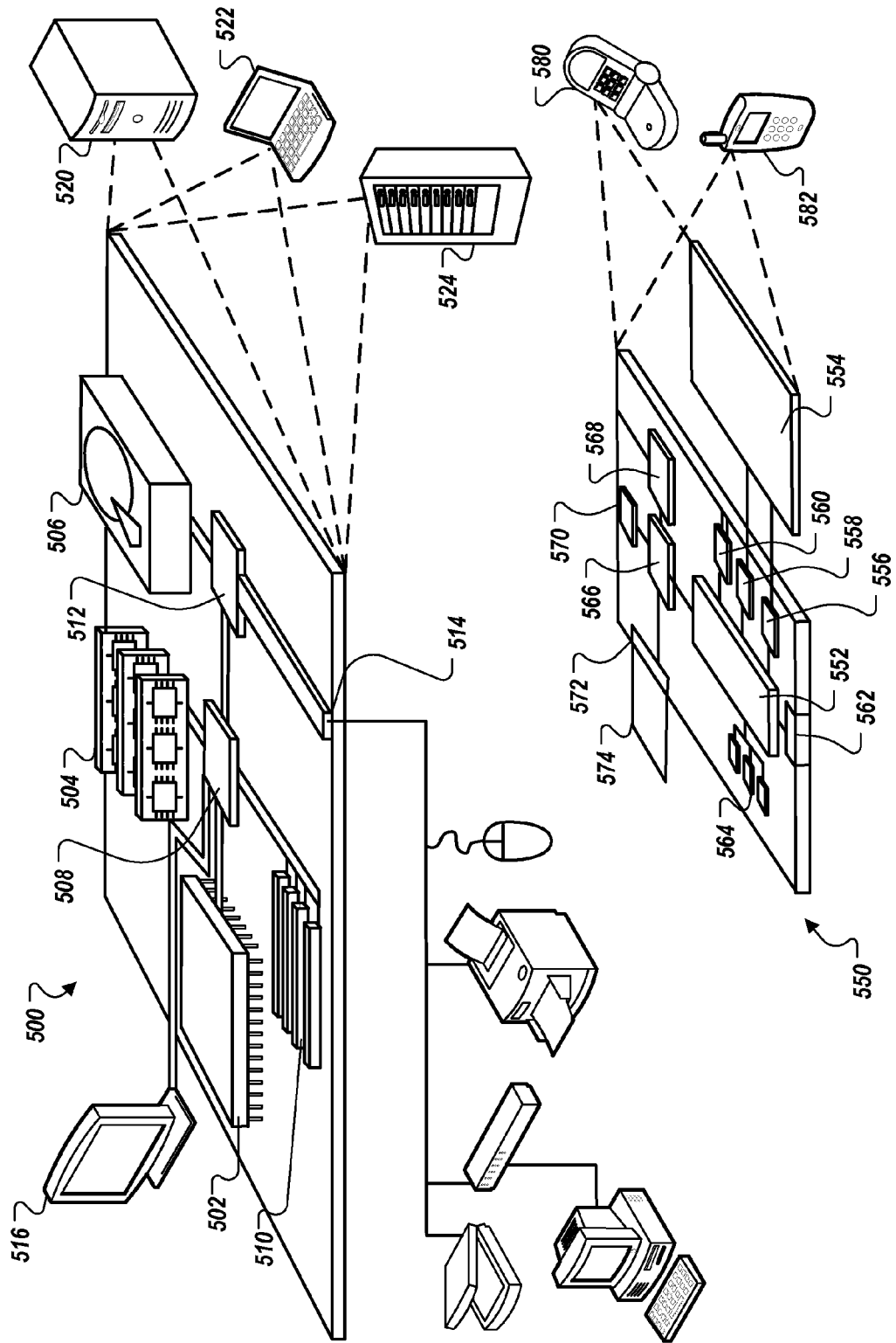
FIG. 5 shows examples of computing devices on which the processes described herein, or portions thereof, may be implemented.

FIG. 5 shows examples of computing devices on which the processes described herein, or portions thereof, may be implemented. In this regard, FIG. 5 shows an example of a generic computing device 500 and a generic mobile computing device 550, which may be used to implement the processes described herein, or portions thereof. For example, search recognizer 210 may be implemented on computing device 500. Mobile computing device 550 may represent the mobile device 101 of FIG. 1.

Computing device 500 is intended to represent various forms of digital computers, examples of which include laptops, desktops, workstations, personal digital assistants, servers, blade servers, mainframes, and other appropriate computers. Computing device 550 is intended to represent various forms of mobile devices, examples of which include personal digital assistants, cellular telephones, smartphones, and other similar computing devices. The components shown here, their connections and relationships, and their functions, are meant to be exemplary only, and are not meant to limit implementations of the implementations described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Components 502, 504, 506, 508, 510, and 512, are interconnected using various busses, and may be mounted on a common motherboard or in other manners as appropriate. The processor 502 may process instructions for execution within the computing device 500, including instructions stored in the memory 504 or on the storage device 506 to display graphical information for a GUI on an external input/output device, for example, display 516 coupled to high speed interface 508. In other implementations, multiple processors and/or multiple buses may be used, as appropriate, along with multiple memories and types of memory. Also, multiple computing devices 500 may be connected, with a device providing a portion of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, examples of which include a magnetic or optical disk.

The storage device 506 is capable of providing mass storage for the computing device 500. In one implementation, the storage device 506 may be or contain a computer-readable medium, examples of which include a floppy disk device, a hard disk device, an optical disk device, or a tape device, a flash memory or other similar solid state memory device, or an array of devices, including devices in a storage area network or other configurations. A computer program product may be tangibly embodied in an information carrier. The computer program product may also contain instructions that, when executed, perform one or more methods, including those described above. The information carrier may be a non-transitory computer- or machine-readable medium, for example, the memory 504, the storage device 506, or memory on processor 502. For example, the information carrier may be a non-transitory, machine-readable storage medium.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, e.g., a keyboard, a pointing device, a scanner, or a networking device, e.g., a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer, e.g., a laptop computer 522. Alternatively, components from computing device 500 may be combined with other components in a mobile device (not shown), e.g., device 550. Such devices may contain one or more of computing device 500, 550, and an entire system may be made up of multiple computing devices 500, 550 communicating with one other.

Computing device 550 includes a processor 552, memory 564, an input/output device, e.g., a display 554, a communication interface 566, and a transceiver 568, among other components. The device 550 may also be provided with a storage device, e.g., a microdrive or other device, to provide additional storage. The components 550, 552, 564, 554, 566, and 568, are interconnected using various buses, and several of the components may be mounted on a common motherboard or in other manners as appropriate.

The processor 552 may execute instructions within the computing device 550, including instructions stored in the memory 564. The processor may be implemented as a chipset of chips that include separate and multiple analog and digital processors. The processor may provide, for example, for coordination of the other components of the device 550, e.g., control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may include appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 may be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided by the SIMM cards, along with additional information, e.g., placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, including those described above. The information carrier is a computer- or machine-readable medium, e.g., the memory 564, expansion memory 574, memory on processor 552, or a propagated signal that may be received, for example, over transceiver 568 or external interface 562.

Device 550 may communicate wirelessly through communication interface 566, which may include digital signal processing circuitry where necessary. Communication interface 566 may provide for communications under various modes or protocols, examples of which include GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, e.g., using a Bluetooth, Wi-Fi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, e.g., through a speaker, e.g., in a handset of device 550. Such sound may include sound from voice telephone calls, may include recorded sound (e.g., voice electronic messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" "computer-readable medium" refers to a computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to a signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be a form of sensory feedback (e.g., visual feedback, auditory feedback, or tactile feedback); and input from the user may be received in a form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or a combination of such back end, middleware, or front end components. The components of the system may be interconnected by a form or medium of digital data communication (e.g., a communication network). Examples of communication networks include a local area network ("LAN"), a wide area network ("WAN"), and the Internet.

The computing system may include clients and servers. A client and server are generally remote from one other and typically interact through a communication network. The relationship of client and server arises by virtue of computer programs running on the respective computers and having a client-server relationship to one other.

In some implementations, the engines described herein may be separated, combined or incorporated into a single or combined engine. The engines depicted in the figures are not intended to limit the systems described here to the software architectures shown in the figures.

For situations in which the systems discussed here collect personal information about users, or may make use of personal information, the users may be provided with an opportunity to control whether programs or features collect personal information (e.g., information about a user's social network, social actions or activities, profession, a user's preferences, or a user's current location), or to control whether and/or how to receive content from the content server that may be more relevant to the user. In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by a content server.

Elements of different implementations described herein may be combined to form other implementations not specifically set forth above. Elements may be left out of the processes, computer programs, Web pages, etc., described herein without adversely affecting their operation. In addition, the logic flows depicted in the figures do not require the particular order shown, or sequential order, to achieve desirable results. Various separate elements may be combined into one or more individual elements to perform the functions described herein.

The features described herein may be combined in a single system, or used separately in one or more systems.

Other implementations not specifically described herein are also within the scope of the following claims.

What is claimed is:

1. A computer-implemented method comprising:
receiving audio that encodes an utterance;
selecting, from among multiple automated speech recognizers that are each associated with a different natural language, a particular subset of the automated speech recognizers;
providing the audio to (i) a first automated speech recognizer of the particular subset that is associated with a first natural language, (ii) a second automated speech recognizer of the particular subset that is associated with a different, second, natural language, and (iii) an a automatic language identifier;
receiving (i) a first transcription of the utterance, in the first natural language, and a first speech recognition confidence score for the first transcription, from the first automated speech recognizer, (ii) a second transcription of the utterance, in the second natural language, and a second speech recognition confidence score for the second transcription, from the second automated speech recognizer, and (iii) data indicating a language associated with utterance, from the automated language identifier;
after receiving (i) the first transcription, (ii) the second transcription, and (iii) the data indicating the language associated with the utterance, selecting, from among the first transcription of the utterance and the second transcription of the utterance, a particular transcription to output as a representative transcription of the utterance based at least on (a) the first speech recognition confidence score, and (b) the second speech recognition confidence score, and (c) the data indicating the language; and
providing the representative transcription for output.

2. The method of claim 1, comprising:
receiving input from a user from whom the audio is received, and
wherein selecting the particular subset of automated speech recognizers comprises selecting, based on the input from the user and from among multiple automated speech recognizers that are each associated with a different natural language, the particular subset of automated speech recognizers.

3. The method of claim 1, comprising:
identifying languages associated with previously-received audio; and
wherein selecting the particular subset of automated speech recognizers comprises selecting, from among multiple automated speech recognizers that are each associated with a different natural language, a particular subset of automated speech recognizers that are each associated with one of the identified natural languages.

4. The method of claim 1, wherein receiving audio data that encodes the utterance comprises receiving audio data that encodes a user's spoken utterance, and
wherein the data indicating the language associated with the utterance reflects (i) an estimated level of fluency of the user in the first natural language and (ii) an estimated level of fluency of the user in the second natural language.

5. The method of claim 1, wherein:
the audio data that encodes the utterance (i) is generated at a computing device and (ii) encodes an utterance spoken by a user of the computing device;
the method further comprises:
receiving data indicating at least one characteristic of one or more of the computing device and the user of the computing device; and
selecting, from among the first transcription of the utterance and the second transcription of the utterance, the particular transcription to output as a representative transcription of the utterance based at least on (a) the first speech recognition confidence score, (b) the second speech recognition confidence score, and (c) the data indicating the language comprises selecting, from among the first transcription of the utterance and the second transcription of the utterance, a particular transcription to output as a representative transcription of the utterance based at least on (a) the first speech recognition confidence score, (b) the second speech recognition confidence score, (c) the data indicating the language, and (d) the data indicating at least one characteristic of one or more of the computing device and the user of the computing device.

6. The method of claim 5, wherein the data indicating at least one characteristic of one or more of the computing device and the user of the computing device includes data indicating a location the computing device.

7. The method of claim 5, wherein receiving data indicating at least one characteristic of one or more of the computing device and the user of the computing device comprises receiving data indicating at least one characteristic of one or more of the computing device and the user of the computing device from an account associated with the user of the computing device.

8. The method of claim 5, wherein providing the representative transcription for output comprises providing the representative transcription to a service that controls one or more functions of an application running on the computing device.

9. A non-transitory computer-readable storage device having instructions stored thereon that, when executed by a computing device, cause the computing device to perform operations comprising:
receiving audio that encodes an utterance;
selecting, from among multiple automated speech recognizers that are each associated with a different natural language, a particular subset of the automated speech recognizers;
providing the audio to (i) a first automated speech recognizer of the particular subset that is associated with a first natural language, (ii) a second automated speech recognizer of the particular subset that is associated with a different, second, natural language, and (iii) an a automatic language identifier;
receiving (i) a first transcription of the utterance, in the first natural language, and a first speech recognition confidence score for the first transcription, from the first automated speech recognizer, (ii) a second transcription of the utterance, in the second natural language, and a second speech recognition confidence score for the second transcription, from the second automated speech recognizer, and (iii) data indicating a language associated with utterance, from the automated language identifier;
after receiving (i) the first transcription, (ii) the second transcription, and (iii) the data indicating the language associated with the utterance, selecting, from among the first transcription of the utterance and the second transcription of the utterance, a particular transcription to output as a representative transcription of the utterance based at least on (a) the first speech recognition confidence score, and (b) the second speech recognition confidence score, and (c) the data indicating the language; and
providing the representative transcription for output.

10. The storage device of claim 9, wherein:
the audio data that encodes the utterance (i) is generated at a computing device and (ii) encodes an utterance spoken by a user of the computing device; and
the data indicating the language associated with the utterance reflects (i) an estimated level of fluency of the user of the computing device in the first natural language and (ii) an estimated level of fluency of the user of the computing device in the second natural language.

11. The storage device of claim 10, wherein the operations comprise:
receiving data that reflects input provided to the computing device by the user of the computing device; and
wherein selecting, from among multiple automated speech recognizers that are each associated with a different natural language, the particular subset of the automated speech recognizers comprises selecting, based on the input and from among multiple speech recognizers that are each associated with a different language, a particular subset of the automated speech recognizers.

12. The storage device of claim 10, wherein providing the representative transcription for output comprises providing the representative transcription to a service that controls one or more functions of an application running on the computing device.

13. A system comprising:
one or more data processing apparatus; and
a computer-readable storage device having stored thereon instructions that, when executed by the one or more data processing apparatus, cause the one or more data processing apparatus to perform operations comprising:
receiving audio data that encodes an utterance;
selecting, from among multiple automated speech recognizers that are each associated with a different natural language, a particular subset of the automated speech recognizers;
providing the audio data to (i) a first automated speech recognizer of the particular subset that is associated with a first natural language, (ii) a second automated speech recognizer of the particular subset that is associated with a different, second, natural language, and (iii) an automated language identifier;
receiving (i) a first transcription of the utterance, in the first natural language, from the first automated speech recognizer, (ii) a second transcription of the utterance, in the second natural language, from the second automated speech recognizer, and (iii) data indicating a first portion of the audio data that is associated with the first natural language and a second portion of the audio data that is associated with the second natural language, from the automated language identifier;
after receiving (i) the first transcription, (ii) the second transcription, and (iii) the data indicating the first portion of the audio data that is associated with the first natural language and the second portion of the audio data that is associated with the second natural language, generating a representative transcription of the utterance comprising (a) a portion of the first transcription that corresponds to the first portion of the audio data that is associated with the first natural language, and (b) a portion of the second transcription that corresponds to the second portion of the audio data that is associated with the second natural language; and
providing the representative transcription for output.

14. The system of claim 13, wherein the operations comprise:
selecting, based at least on the data received from the automated language identifier and from among the first transcription of the utterance and the second transcription of the utterance, two or more transcription portions that include (a) a portion of the first transcription that corresponds to the first portion of the audio data that is associated with the first natural language, and (b) a portion of the second transcription that corresponds to the second portion of the audio data that is associated with the second natural language, and
wherein generating the representative transcription of the utterance comprises generating a representative transcription of the utterance includes the two or more selected transcription portions.

15. The system of claim 13, wherein the operations comprise:
receiving, from the first and second automated speech recognizers, a speech recognition confidence score for each of two or more portions of first and second transcriptions of the utterance, respectively, and
wherein selecting the two or more transcription portions comprises selecting the two or more transcription portions based at least on the multiple speech recognition confidence scores and the data received from the automated language identifier.

16. The system of claim 13, wherein:
the audio data that encodes the utterance (i) is generated at a computing device and (ii) encodes an utterance spoken by a user of the computing device;
the operations further comprise:
receiving data that identifies one or more of the computing device and the user of the computing device; and
after receiving (i) the first transcription, (ii) the second transcription, and (iii) the data indicating the first portion of the audio data that is associated with the first natural language and the second portion of the audio data that is associated with the second natural language, generating a representative transcription of the utterance, comprises after receiving (i) the first transcription, (ii) the second transcription, (iii) the data indicating the first portion of the audio data that is associated with the first natural language and the second portion of the audio data that is associated with the second natural language, and (iv) the data that identifies one or more of the computing device and the user of the computing device, generating a representative transcription of the utterance.

17. The system of claim 16, wherein the operations comprise:
determining, based at least on the data that identifies one or more of the computing device and the user of the computing device, that the user of the computing device is fluent in a particular subset of the natural languages; and
wherein selecting, from among multiple automated speech recognizers that are each associated with a different natural language, a particular subset of the automated speech recognizers comprises selecting, in response to determining that the user of the computing device is fluent in the particular subset of the natural languages and from among multiple automated speech recognizers that each associated with a different natural language, a particular subset of the automated speech recognizers that are each associated with a different one of the particular subset of the natural languages.

18. The system of claim 16, wherein providing the representative transcription for output comprises providing the representative transcription to a service that controls one or more functions of an application running on the computing device.

* * * * *